US008749191B2

(12) United States Patent
Wang

(10) Patent No.: US 8,749,191 B2
(45) Date of Patent: Jun. 10, 2014

(54) FLOAT SWITCH

(75) Inventor: Liming Wang, Suzhou (CN)

(73) Assignee: GP Enterprises Co., Ltd., Suzhou, Jiangsu Province (CN)

( * ) Notice: Subject to any disclaimer, the term of this patent is extended or adjusted under 35 U.S.C. 154(b) by 388 days.

(21) Appl. No.: 13/388,004

(22) PCT Filed: Jun. 12, 2010

(86) PCT No.: PCT/CN2010/000843

§ 371 (c)(1),
(2), (4) Date: Jan. 30, 2012

(87) PCT Pub. No.: WO2011/015030

PCT Pub. Date: Feb. 10, 2011

(65) Prior Publication Data

US 2012/0125756 A1 May 24, 2012

(30) Foreign Application Priority Data

Aug. 4, 2009 (CN) .......................... 2009 1 0183885

(51) Int. Cl.
*H02P 1/42* (2006.01)
*H02P 1/44* (2006.01)
*H02P 23/00* (2006.01)

(52) U.S. Cl.
USPC ............................ 318/786; 318/789; 335/151

(58) Field of Classification Search
CPC ..................................................... F04B 49/025
USPC .................................. 318/786, 789; 335/151
See application file for complete search history.

(56) References Cited

U.S. PATENT DOCUMENTS

| | | | | |
|---|---|---|---|---|
| 5,294,917 | A * | 3/1994 | Wilkins | 340/625 |
| 7,060,180 | B1 * | 6/2006 | Barnes | 210/167.11 |
| 7,429,842 | B2 * | 9/2008 | Schulman et al. | 318/482 |
| 7,972,117 | B1 * | 7/2011 | MacDonald | 417/40 |

FOREIGN PATENT DOCUMENTS

| | | | |
|---|---|---|---|
| CN | 88202383 | U | 11/1988 |
| CN | 201007571 | Y | 1/2008 |
| CN | 101656169 | A | 2/2010 |
| DE | 29812132 | U1 | 9/1998 |
| JP | 11167850 | A | 6/1999 |

* cited by examiner

*Primary Examiner* — Erick Glass

(74) *Attorney, Agent, or Firm* — Morris Manning & Martin LLP; Tim Tingkang Xia, Esq.

(57) ABSTRACT

A float switch includes a floater (106), a float leader (105), a reed pipe detection device and a relay (101). The floater (106) is sleeved on the float leader (105), and can slide freely. The reed pipe detection device comprises a high-level reed pipe (108), a low-level reed pipe (109) and a magnet (107). The float leader (105) is hollow. The high-level reed pipe (108) and the low-level reed pipe (109) are located in a high level and a low level inside the float leader (105) respectively. The magnet (107) is provided inside the floater (106). A motor is controlled by the relay (101) in the float switch. The motor begins to work when the relay (101) is switched on, and the motor stops working when the relay (101) is switched off. The switch has a long service life, high reliability and an excellent waterproof property. The float switch has a simple manufacture and installation process, less fraction defective and condemnation factor, thus further reduces the cost.

4 Claims, 2 Drawing Sheets

FLOAT SWITCH

TECHNICAL FIELD

The present invention relates to a float switch, and specifically relates to a float switch for a water pump, which belongs to the technical field of fluid engineering.

BACKGROUND OF THE INVENTION

In the prior art, float switches for water pumps use mechanical switches. Generally, the mechanical switches are not good in sealing property and not long in service life. The complex mechanical structures are not ideal in reliability. Products are poor in waterproof performance, the misgiving about the situation that moisture may enter into the products can not be completely avoided, and the metal oxidation phenomenon may occur. The products are complex in production and mounting and high in fraction defective and scrappage rate so as to cause the high cost of the products.

SUMMARY OF THE INVENTION

Against the existing technical problems, the invention aims at providing a float switch with long service life and high reliability.

The technical solution of the invention is realized as follows. A float switch comprises a float, a float guide rod, a dry reed pipe detection device and a relay. The float is sheathed on the float guide rod and can slide freely. The dry reed pipe detection device comprises a high-level dry reed pipe, a low-level dry reed pipe and a magnet. The interior of the float guide rod is hollow, the high-level dry reed pipe and the low-level dry reed pipe are arranged at the high level and the low level in the float guide rod respectively. The magnet is arranged in the float. When the water level is low, the height of the float is also low. The low-level dry reed pipe is switched on due to attraction of the magnet, the high-level dry reed pipe can not be switched on because the high-level dry reed pipe is farther away from the magnet, and the relay is further switched off through the control of a circuit at this time. When water is slowly injected from the outside, the water level rises slowly, and the float also rises slowly. When the water level rises to the high level, the low-level dry reed pipe can not be switched on because the low-level dry reed pipe is farther away from the magnet, the high-level dry reed pipe is switched on because the high-level dry reed pipe is nearer to the magnet, and the relay is further switched on through the control of the circuit.

Preferably, the relay is mounted in a container for mounting the relay and the container for mounting the relay is in the shape of a funnel.

Preferably, a motor is connected in the circuit of the relay. When the relay is switched on, the motor works, and when the relay is switched off, the motor stops working.

Preferably, the circuit of the float switch comprises an RC (resistor-capacitor) voltage-dropping power supply part, a dry reed pipe detection part, a control part, a relay driving and protection part, and a relay switch part. The control part is used for on-off control of not only the relay but also a 150R bleeder resistor of the power supply part. In addition to the function of driving the relay, more important, the relay driving and protection part is used for protecting a contact of the relay from being damaged by instantaneous high-voltage arcing generated by a coil of the motor. The RC voltage-dropping power supply part selects a capacitor passing the safety considerations, a fuse is simultaneously added and the circuit can work normally under great fluctuations in voltage.

The float switch according to the present invention adopts the dry reed pipe detection device for controlling the relay. When the high-level dry reed pipe is switched on, the relay is switched on. The relay is further used for controlling the motor. When the relay is switched on, the motor works, and when the relay is switched off, the motor stops working The service life is long and the reliability is high. The control circuit is not only simple and low in cost, but also good in reliability and wide in working voltage. The product adopts the glue-pouring sealing way, so that the product is excellent in waterproof performance, the misgiving about the situation that the moisture may enter into the product can be completely avoided, the metal oxidation phenomenon can be also avoided and the reliability of the product is further enhanced. The product is simple in production and mounting and lower in fraction defective and scrappage rate, and the cost of the product is further reduced.

BRIEF DESCRIPTION OF THE DRAWINGS

In combination of the following figures, the invention is further described.

wherein, 101: relay; 102: relay support; 103: container for mounting relay; 104: mounting plate; 105: float guide rod; 106: float; 107: magnet; 108: high-level dry reed pipe; 109: low-level dry reed pipe.

DETAILED DESCRIPTION OF THE INVENTION

Figure 1:
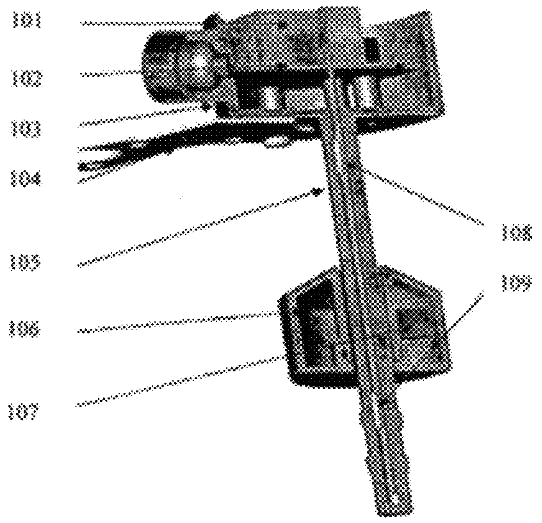
FIG. 1 is a structural diagram of a float switch of the invention.
Figure 2:
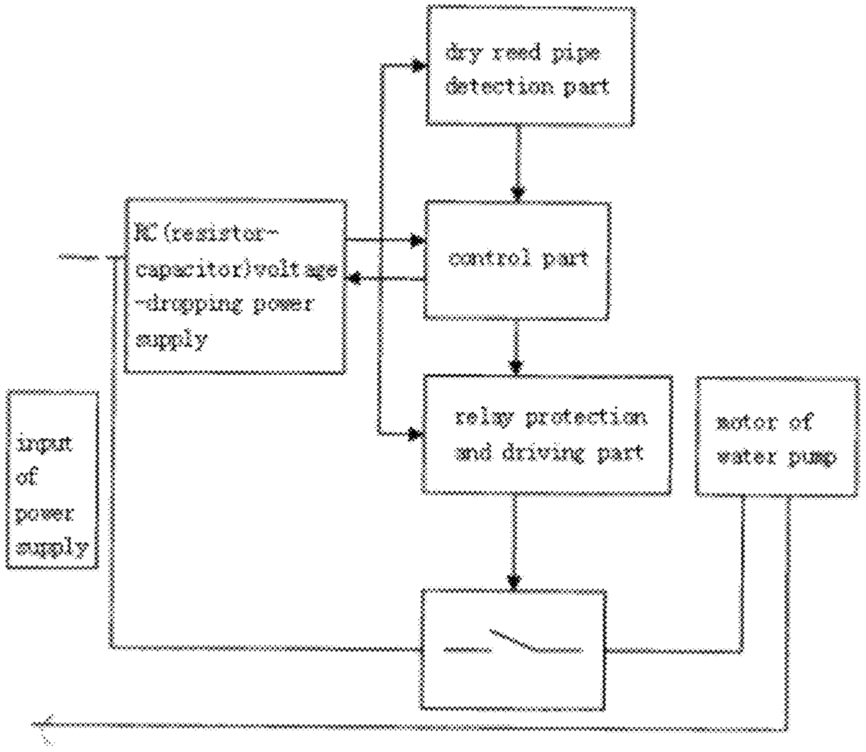
FIG. 2 is a circuit principle diagram of a float switch of the invention.
Figure 3:
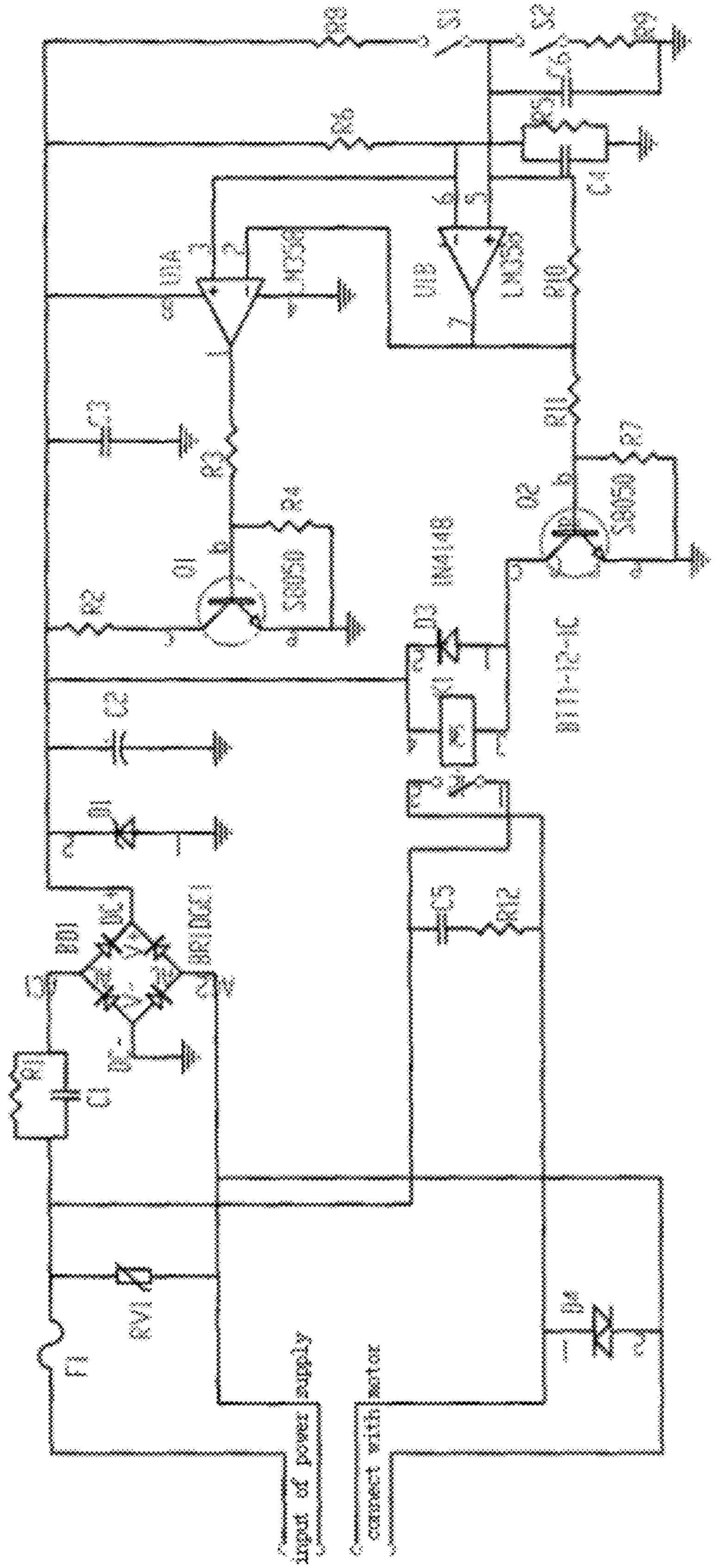
FIG. 3 is a circuit diagram of a float switch of the invention.

As shown in FIG. 1, a float switch of the invention comprises a float 106, a float guide rod 105, a dry reed pipe detection device and a relay 101. The float 106 is sheathed on the float guide rod 105 and can slide freely. The dry reed pipe detection device comprises a high-level dry reed pipe 108, a low-level dry reed pipe 109 and a magnet 107. The interior of the float guide rod 105 is hollow. The high-level dry reed pipe 108 and the low-level dry reed pipe 109 are arranged at the high level and the low level in the float guide rod respectively. The magnet 107 is arranged in the float 106. When the water level is low, the height of the float is also low. The low-level dry reed pipe 109 is switched on due to attraction of the magnet, the high-level dry reed pipe 108 can not be switched on because the high-level dry reed pipe 108 is farther away from the magnet, and the relay 101 is further switched off through the control of a circuit at this time. When water is slowly injected from the outside, the water level rises slowly, the float also rises slowly. When the water level rises to the high level, the low-level dry reed pipe 109 can not be switched on because the low-level dry reed pipe 109 is farther away from the magnet, the high-level dry reed pipe 108 is switched on because the high-level dry reed pipe 108 is nearer to the magnet, and the relay 101 is further switched on through the control of the circuit. The relay 101 is mounted on a relay support 102 in a container 103 for mounting the relay and the container 103 for mounting the relay is in the shape of a funnel. A mounting plate 104 is further arranged on the float switch. The mounting plate 104 is arranged on the container 103 for mounting the relay and the float switch can be mounted on a water pump (not shown in the figure) through the mounting plate 104. A motor (not shown in the figure) is connected in the circuit of the relay 101. When the relay is switched on, the motor works, and when the relay is switched off, the motor stops working As shown in FIGS. 2 and 3, namely a circuit principle diagram and a circuit diagram of the float switch of the invention, the circuit of the float switch comprises an RC voltage-dropping power supply part, a dry reed pipe detection part, a control part, a relay driving and protection part, and a relay switch part. The control part is used for on-off control of not only the relay but also a 150R bleeder resistor of the power supply part. In addition to the function of driving the relay, more important, the relay driving and protection part is used for protecting a contact of the relay from being damaged by instantaneous high-voltage arcing generated by a coil of the motor. The RC voltage-dropping power supply part selects a capacitor passing the safety considerations, a fuse is simultaneously added and the circuit can work normally under great fluctuations in voltage. The detailed description of the circuit diagram is as follows: S1 is the high-level dry reed pipe, S2 is the low-level dry reed pipe, and when the magnet approaches the dry reed pipe, the dry reed pipe is switched on. The pin 3 of U1A and the pin 6 of U1B obtain one half of the voltage of a power supply through resistance voltage division. When the water level is in the high level, the float is positioned in the high-level dry reed pipe S1, as the magnet in the float approaches the high-level dry reed pipe, the S1 dry reed pipe is switched on at this time. The S1 is switched on, the voltage of the pin 5 of the U1B is higher than that of the pin 6, the operational amplification is performed on the U1B for outputting high level. When the U1B outputs the high level, Q2 is conducted, the relay is switched on, the water pump is used for pumping the water, the pin 2 of the U1A is simultaneously connected to the pin 7 of the U1B, then the voltage of the pin 2 of the U1A is higher than that of the pin 3, the U1A further outputs low level, Q1 is cut off and R2 is disconnected from the ground. As the relay is switched on, the water pump is used for pumping the water, the water level drops, the float also drops along with the water surface. When the water level drops to a certain height, the high-level dry reed pipe S1 is switched off, at this time, as the U1B originally outputs the high level and the high level is fed back to the input end pin 5 through R10, the pin 5 is still in high level and the output still maintains the high level. When the water level drops continuously, the float also drops in a following manner. When the water level drops to a certain position, the S2 is switched on. At this time, as the S2 is switched on, the pin 5 of the U1B is grounded through R9, the R9 is much smaller than the R10 and the voltage of the pin 5 is less than one half of the voltage of the power supply (the voltage of the pin 6 is just one half of the voltage of the power supply because R6 and R5 are equivalent) according to the formula of the resistance voltage division, the U1B outputs the low level. The U1B outputs the low level, the Q2 is cut off, the relay is switched off, and the water pump stops pumping the water. Simultaneously, as the pin 2 of the U1A is connected to the output of the U1B, the pin 2 of the U1A is also in low level. The U1A outputs the high level, the Q1 is conducted, and the R2 is grounded for providing a discharge loop for the power supply so as to prevent the voltage from rising. As the water pump stops pumping the water, the water level rises slowly and the float is separated from the low-level dry reed pipe S2 slowly. When the water level rises to the certain height, the S2 is switched off, as the U1B outputs the low level, the pin 5 of the U1B maintains the low level through the feedback of the R10 and the output of the U1B keeps the low level. When the water level rises to the certain height, the high-level dry reed pipe is switched on, and then the above process is repeated. At the instant of cutting off the power supply by the motor, the instantaneous high voltage can be generated due to mutation in magnetic flux, and D4 is used for clamping the voltage at two ends so as to protect the contact of the relay and prolong the service life of the relay.

The float switch adopting the scheme of the invention adopts the dry reed pipe detection device for controlling the relay. When the high-level dry reed pipe is switched on, the relay is switched on, and the relay is further used for controlling the motor. When the relay is switched on, the motor works, and when the relay is switched off, the motor stops working. The service life is long and the reliability is high. The control circuit is not only simple and low in cost, but also good in reliability and wide in working voltage. The product adopts the glue-pouring sealing way, so that the product is excellent in waterproof performance, the misgiving about the situation that the moisture may enter into the product can be completely avoided, the metal oxidation phenomenon can be also avoided and the reliability of the product is further enhanced. The product is simple in production and installation and lower in fraction defective and scrappage rate, and the cost of the product is further reduced.

The above embodiment is only used for describing the technical concept and the characteristics of the invention and aims at enabling people who are familiar with the technology to understand the contents of the invention and perform implementation rather than limiting the protection range of the invention, and all the equivalent changes or the modifications made according to the spirit of the invention shall be considered within the protection range of the invention.

What is claimed is:

1. A float switch, characterized by comprising a float, a float guide rod, a dry reed pipe detection device and a relay, wherein the float is sheathed on the float guide rod and can slide freely; the dry reed pipe detection device comprises a high-level dry reed pipe, a low-level dry reed pipe and a magnet; the interior of the float guide rod is hollow, the high-level dry reed pipe and the low-level dry reed pipe are arranged at the high level and the low level in the float guide rod respectively and the magnet is arranged in the float; when the water level is low, the height of the float is also low, the low-level dry reed pipe is switched on due to attraction of the magnet, the high-level dry reed pipe can not be switched on because the high-level dry reed pipe is farther away from the magnet and the relay is further switched off through the control of a circuit at this time; when water is slowly injected from the outside, the water level rises slowly, the float also rises slowly, when the water level rises to the high level, the low-level dry reed pipe can not be switched on because the low-level dry reed pipe is farther away from the magnet, the high-level dry reed pipe is switched on because the high-level dry reed pipe is nearer to the magnet, and the relay is further switched on through the control of the circuit.

2. The float switch according to claim 1, characterized in that the relay is mounted in a container for mounting the relay and the container for mounting the relay is in the shape of a funnel.

3. The float switch according to claim 1, characterized in that a motor is connected in the circuit of the relay, when the relay is switched on, the motor works; when the relay is switched off, the motor stops working.

4. The float switch according to claim 1, characterized in that the circuit of the float switch comprises a RC (resistor-capacitor) voltage-dropping power supply part, a dry reed pipe detection part, a control part, a relay driving and protection part and a relay switch part, wherein the control part is used for on-off control of not only the relay but also a 150R bleeder resistor of the power supply part; in addition to the function of driving the relay, more important, the relay driving and protection part is used for protecting a contact of the relay from being damaged by instantaneous high-voltage arcing generated by a coil of the motor; and the RC voltage-dropping power supply part selects a capacitor passing the safety considerations, a fuse is simultaneously added and the circuit can work normally under great fluctuations in voltage.

* * * * *